United States Patent [19]

Sakai

[11] Patent Number: 4,880,329
[45] Date of Patent: Nov. 14, 1989

[54] JOINT

[75] Inventor: Motohiro Sakai, Komaki, Japan

[73] Assignee: Tokai TRW & Co., Ltd., Kasugai, Japan

[21] Appl. No.: 209,872

[22] Filed: Jun. 22, 1988

[30] Foreign Application Priority Data

Jun. 30, 1987 [JP] Japan .................................. 62-161202

[51] Int. Cl.[4] .............................................. F16C 11/00
[52] U.S. Cl. .................................... 403/134; 403/140;
403/135; 29/149.5 B
[58] Field of Search ................ 403/140, 135, 122, 136,
403/132, 138, 134; 29/149.5 B

[56] References Cited

U.S. PATENT DOCUMENTS

| 3,817,640 | 6/1974 | Carter et al. | ......................... 403/138 |
| 4,034,996 | 7/1977 | Manita et al. | .................... 403/140 X |
| 4,163,617 | 8/1979 | Nemoto | ............................. 403/132 |

FOREIGN PATENT DOCUMENTS 59-174417  5/1983  Japan .
2106173    4/1983  United Kingdom ................ 403/132

Primary Examiner—Andrew V. Kundrat
Attorney, Agent, or Firm—Ladas & Parry

[57] ABSTRACT

A joint has a cylindrical socket which is opened at at least one end thereof, an inner joint portion having a ball-shaped portion and at least one shaft portion integral with the ball-shaped portion, a bearing portion fitted in the socket portion and having a recess which has a configuration complementary to the outer configuration of the inner joint portion, the recess rockably and slidably supports the ball portion of the inner joint portion, the bearing portion being supported at an and of the socket opposite to the open end of the socket by a flange portion which projects radially inward from the end of the socket opposite to the open end, a support member disposed within the opening of the open end of the socket at the on end side and capable of cooperating with the flange portion in supporting the bearing portion in the axial direction, and a boot portion disposed between the shaft portion of the inner joint portion and the socket so as to prevent foreign matter from coming into a gap between the sliding contact surfaces of the bearing portion and the ball-shaped portion. The support member includes a plug which is constituted by a tabular portion disposed within the opening of the socket and held in contact with an adjacent end surface of the bearing portion and a cylindrical portion which expands radially and axially outward from an outer periphery of the tabular portion, a wall of the socket defining the opening having a step such that radius of the opening is decreased at a side closer to an open end thereof, the plug engaging at the expanded end of the cylindrical portion thereof with the step in the opening of the socket so as to support the bearing, thereby enabling to securely hold the bearing portion in the socket.

4 Claims, 5 Drawing Sheets

PRIOR ART

JOINT

BACKGROUND OF THE INVENTION

1. Field of the Invention

The present invention relates to a joint and, more particularly, to a joint of the type which has a cylindrical socket opened at at least one end thereof, an inner joint portion composed of a ball-shaped portion and shaft portions integral therewith, and a bearing portion received in the cylindrical socket and having a recess configured complementary to the outer configuration of the inner joint portion so as to rockably and slidably support the ball-shaped portion, the socket being provided at the other end thereof with a flange portion projecting radially inward therefrom so as to support the bearing portion. More particularly, the present invention is concerned with a joint of the type mentioned above, wherein a support is disposed within the opening of the socket at the one end so as to cooperate with the flange portion in supporting the bearing portion in the axial direction, and wherein a boot portion is disposed between the shaft portion of the inner joint portion and the socket so as to prevent any foreign matter from coming into the minute gap between sliding contact surfaces of the bearing portion and the ball portion.

2. Description of the Related Art

FIG. 10 shows a conventional joint of the type to which the invention pertains, known as pillow ball bush. This joint, generally denoted by a numeral 115, has an inner joint portion 100 which is constituted by a pair of shaft portions 101 and a ball portion 102 between these shaft portions 101. The ball portion 102 is rockably and slidably supported by a recess 103 in the bearing portion 104 which is supported by a flange portion 106 projecting radially inward from one end of a socket 105. A stopper ring or a snap ring 107 is disposed between the inner peripheral surface of an opening 108 of the socket 105 and the shaft portion 101 of the joint portion 110. More specifically, the stopper ring or the snap ring 107 is received in a groove 109 formed in the inner peripheral surface of the opening 108. The ring 107 supports the bearing portion 104 at the opposite side to the flange portion 106 of the socket 105. The joint further has a pair of boot portions 110, 111 which are disposed in the bore of the socket portion 105. More specifically, one 110 of the boot portions is disposed between the inner peripheral surface of the socket 105 and one of the shaft portions 101 of the inner joint portion 100, at the axially outer side of the snap ring 107. The other 111 of the boot portions is disposed between the inner peripheral surface of the socket 105 and the other of the shaft portions 101 of the inner joint portion 100, at the axially outer side of the flange portion 106.

The joint of the type having a snap ring, however, often exhibits looseness particularly in the portion where the snap ring is fitted, and has a small resistance against any force which acts to axially pull out the inner joint portion.

SUMMARY OF THE INVENTION

Accordingly, an object of the present invention is to provide a joint of the type mentioned above, wherein the bearing portion is securely held in the socket without substantial looseness.

To this end, according to the present invention, there is provided a joint of the type mentioned above, wherein a support member, which is disposed in the opening of the socket so as to support the bearing portion at the one end side of the socket, has a plug which is constituted by a tabular portion contacting the end surface of the bearing within the opening of the socket and a cylindrical portion which extends or expands radially and axially outward from the peripheral end portion of the tabular portion, and wherein a step is formed on the inner peripheral surface of the opening of the socket such that the axially outer end of the opening has the smaller diameter, the plug engaging at its expanded end with the step in the opening of the socket so as to support the socket.

Thus, in the joint according to the present invention, firstly because the support member, which is disposed in the opening of the socket so as to support the bearing portion at the one end of the socket, has a plug which is constituted by a tabular portion contacting the end surface of the bearing within the opening of the socket and a cylindrical portion which extends or expands radially and axially outward from the peripheral end portion of the tabular portion, secondly because a step is formed on the inner peripheral surface of the opening of the socket such that the axially outer end of the opening has the smaller diameter, and thirdly because the plug engages at its expanded end with the step in the opening of the socket so as to support the socket, the bearing portion is securely held in the socket without any looseness and, consequently, the ball portion rockably and slidably contacted with the bearing portion can be securely held within the socket without looseness.

In a preferred embodiment of the present invention, the plug is composed of an annular member surrounding the shaft portion of the inner joint portion, and the boot portion is disposed on the axially outer side of the plug.

In a preferred embodiment of the present invention, the expanded end of the cylindrical portion of the plug is provided with a plurality of notches, whereby the press-fit is facilitated and resistance to external pull-out force is increased.

In a preferred embodiment of the present invention, the expanded end of the plug is pressed into contact with the inner peripheral surface of the opening of the socket by resiliency thereof or by caulking so as to firmly engage with the step in the socket.

In a preferred embodiment of the present invention, the step in the opening of the socket is constituted by one of the side walls of an annular groove formed in the inner peripheral surface of the socket defining the opening.

In a preferred embodiment of the present invention, the boot portion is disposed between the inner peripheral surface of the socket defining the opening and the shaft portion of the inner joint portion, so that the boot portion is effectively protected from any external damaging force.

The above and other objects, features and advantages of the present invention will become clear from the following description of the preferred embodiments when the same is read in conjunction with the accompanying drawings.

DESCRIPTION OF THE PREFERRED EMBODIMENTS

Figure 1:
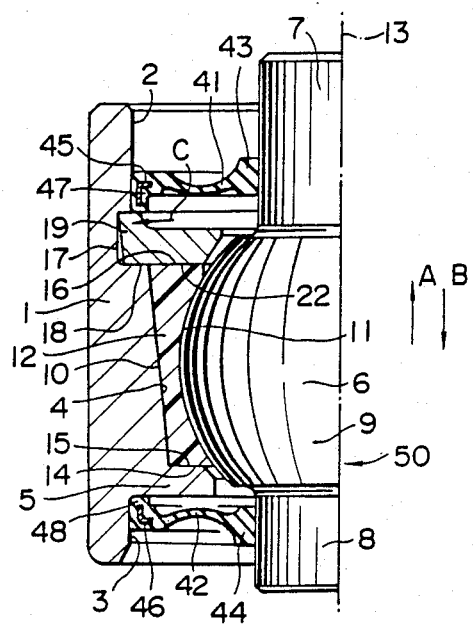
FIG. 1 illustrates in section a pillow ball bush as a preferred embodiment of the joint in accordance with the present invention.
Figure 2:
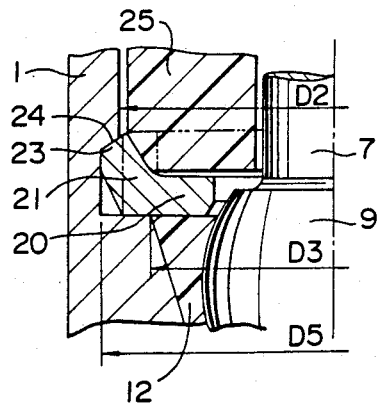
FIG. 2 is a sectional view similar to FIG. 1, illustrating a plug caulked in the bush as shown in FIG. 1.
Figure 3:
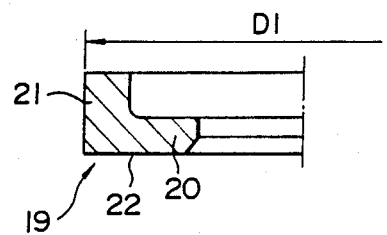
FIG. 3 is a front elevational sectional view of a plug used in the pillow ball bush of FIG. 1 in the state before it is mounted in the pillow ball bush.

Referring to FIGS. 1 to 3, a first embodiment of the joint of the present invention has a metallic cylindrical socket 1 which is provided at its both axial ends with large-diameter bores 2 and 3. The socket 1 further has a frusto-conical bore 4 between the large-diameter bores 2,3 and a flange portion 5 which projects radially inwardly from inner face of the socket 1 at a portion between the bores 3 and 4.

The joint further has a pillow ball 6 constituting an inner joint portion which is composed of shaft portions 7, 8 and a ball-shaped portion 9 integral with these shaft portions. The pillow ball 6 is slidably and rockably received in a bearing 12 made of a suitable material such as a plastic material or sintered metal. The bearing 12 has an outer surface 10 configured complementary to the configuration of the inner peripheral surface of the bore 4 in the socket and an inner peripheral surface 11 configured complementary to the outer peripheral surface of the ball portion 9. One end surface 14 of the bearing 12 as viewed in the direction of axis 13 is held in contact with one end surface 15 of the flange portion 5, while the other end surface 16 of the bearing 12 is substantially flush with a shoulder 18 or one of the side walls of an annular groove 17 which is formed between the large-diameter bore 2, and the bore 4, both defining the opening.

Reference numeral 19 denotes a plug serving as a support member fitted in the annular groove 17 of the socket 1. The plug 18 has an annular tabular portion 20 and a cylindrical portion 21. The annular tabular portion 20 has an outside diameter $D_1$ which is intermediate between the inside diameter $D_2$ of the large-diameter bore portion 2 of socket 1 and the diameter $D_3$ of the shoulder 18 or the end of the bore 4 for receiving the bearing 12. The cylindrical portion 21 is extended in the direction of the axis 13 from one end of the outer periphery of the annular tabular portion 20 and is expanded radially outward at at least a portion thereof. One side surface 22 of the annular tabular portion 20 contacts the shoulder 18 of the socket 1 and the end surface 16 of the bearing 12, while the extended end 23 of the cylindrical portion 21 contacts the step 24 of the groove 17 near the opening 2 thereby eliminating any looseness of the bearing 12 in the direction of axis 13, as well as any risk for the bearing 12 to be pulled out by external force. The bearing 12 in turn prevents the pillow ball 6 from becoming loose and being pulled out by external force.

To explain in more detail, the cylindrical portion 21 of the plug 19 has a constant or uniform outside diameter $D_1$ before it is mounted in the socket 1. In the assembly, the plug 19 is placed in the groove 17 formed in the surface defining the opening of the socket 1 having the diameter $D_2$ ($D_2 > D_1$), and the cylindrical portion 21 of the plug 19 is caulked over the entire periphery or at a plurality of points thereof, so that at least a portion of the end 23 of the cylindrical portion 21 is expanded into engagement with the step 24 or the side wall of the groove 17 adjacent to the opening of the socket, whereby the plug 19 is mounted in the groove 17.

In the assembled state of the joint, the enlarged end 23 of the cylindrical portion 21 of the plug 19 is held in engagement with the step 24 in the opening 2, so that the plug 19 is prevented from being pulled out in the direction of the arrow A. In addition, the bearing 12, as well as the ball portion 9 of the pillow ball 6, is stably held or kept in the socket 1 without any looseness in the directions of arrows A and B and without any risk of extraction in the direction of the arrow A. It is to be understood that the movement of the plug 18 in the direction of the arrow A is inevitably accompanied by a displacement of the end 23 of the cylindrical portion 21 in the direction of an arrow C, so that the movement of the plug 18 in the direction of the arrow A is remarkably suppressed, thus avoiding any risk for the bearing 12 and the pillow ball 6 to be loosened or extracted.

Figure 4:
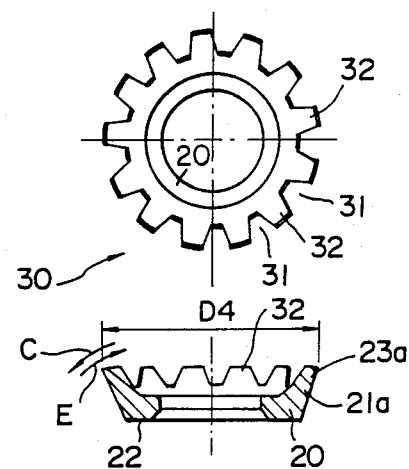
FIG. 4 illustrates a modification of the plug used in the joint of the present invention, in plan at upper portion and in front section at lower portion thereof.

The plug used in the joint of the present invention may engage with the groove 17 by the resiliency of the cylindrical portion 21, instead of caulking. In such a case, a modified plug such as that 30 shown in FIG. 4 may be used. More specifically, the plug 30 before the mounting has a cylindrical portion 21a the diameter of which progressively increases as a function of the distance from the annular tabular portion 20. The expanded or divergent end 23a of the cylindrical portion 21a is provided with a plurality of notches 31 which define therebetween teeth 32. The diameter $D_4$ of an envelove or circle contacting the outer ends of the teeth 32 is greater than the inside diameter $D_2$ of the large-diameter bore 2 of the socket, before the plug 30 is mounted. It is preferred that the diameter $D_4$ is slightly greater than the diameter $D_5$ of the groove 17 at the bottom thereof, though it may be smaller than the diameter $D_5$. In the assembly, the plug 30 is forced into the large-diameter portion 2 of the socket 1 in the direction of an arrow B along the axis 13 which the teeth 32 are kept bent in the direction E. So that the end surface 22 of the annular tabular portion 20 of the plug 30 is brought into contact with the end surface 16 of the bearing 12. The plug 30 is further pressed into the bore 2 of the socket 1 until it contacts the shoulder 18 in the socket 1. During the pressing, the bearing 12 may be slightly compressed in the axial direction. Meanwhile, the end 23a of the cylindrical portion 21a of the plug 30 is moved into the groove 17 past the step 24 so as to engage with the step 24. In this assembled state of the joint, the plug 30 is prevented from being withdrawn in the direction of the arrow A, due to engagement between the teeth 32 of the plug 30 and the step 24 in the socket, whereby the bearing 12 and the ball portion 9 of the pillow ball 6 are stably held or concealed within the socket 1 without any looseness in the directions of arrows A, B and without any risk of extraction in the direction of the arrow A. It will be understood that the movement of the plug 30 in the direction of the arrow A is accompanied by deformation of the teeth 32 back in the direction of an arrow C, whereby the tendency for the plug 30 to move in the direction of the arrow A, as well as the tendencies for the bearing 12 and the pillow ball 6, are remarkably suppressed.

The joint further has annular boot portions 41, 42 made of a rubber. The boot portions 41 and 42 fit at their inner peripheral thickened portions with the shaft portions 7 and 8 and fit in the large-diameter bores 2 and 3 in the socket 1 at their outer peripheral thickened portions 47, 48 which are reinforced with metallic reinforces.

In the pillow ball bush 50 as a preferred embodiment of the joint the present invention, when a large external force is applied to the pillow ball 6 in the axial direction thereof, the plug 19 or 30 effectively prevents the bearing 12 and the pillow ball 6 from becoming loose or coming off. It is also to be understood that the boot portions 41, 42 are effectively protected against any external damaging force because they are placed in the bores 2 and 3 in the socket 1. These boot portions 41 and 42 effectively prevent any foreign matters from coming into the minute gaps between the sliding contact surface of the ball portion 9 of the pillow ball 6 and the sliding contact surface of the bearing 12.

Figure 5:
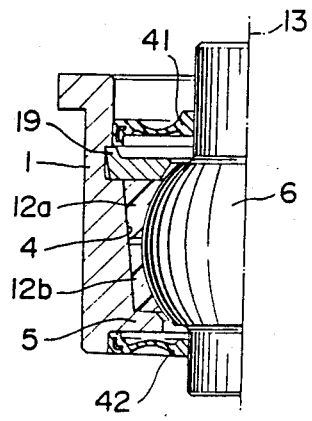
FIG. 5 is a sectional view of a pillow ball bush as another preferred embodiment of the present invention.

The bearing 12 may be in the form of an assembly composed of two portions 12a and 12b which are disposed in the direction of the axis 13, as shown in FIG. 5. In such a case, the joint can easily be assembled by inserting a lower bearing portion 12b into the bore 4 in the socket 1, placing the pillow ball 6 and then inserting the upper bearing portion 12a.

Figure 6:
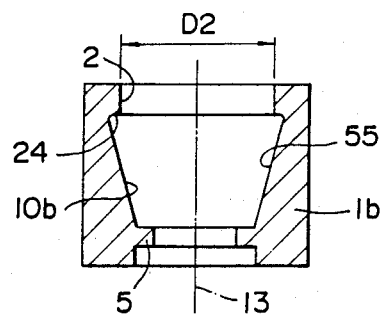
FIG. 6 is a sectional view of a modification of the socket used in a pillow ball bush embodying the present invention.

The groove 17, which is formed in the inner peripheral surface of the socket 1 of the pillow ball bush 50 shown in FIG. 1, may be omitted provided that a step 24 is formed in the bore of the socket 1 adjacent to the bore 2. FIG. 6 shows an example of such a modification. This joint has a socket 1b provided with a central bore 10b opened through an opening 2. The diameter of the bore 10b is selected, at at least the end thereof adjacent to the opening 2, to be greater than the diameter $D_2$ of the opening 2 so as to provide a large-diameter portion 55 in which the plug 19 is mounted. In this case, the bearing 12 is placed in the portion of the same bore 10b adjacent to the flange 5.

Figure 7:
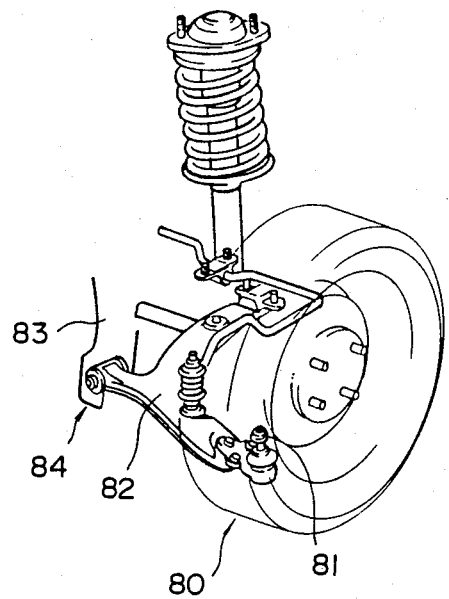
FIG. 7 is an illustration of a suspension ball joint as a practical application of the joint of the present invention.
Figure 10:
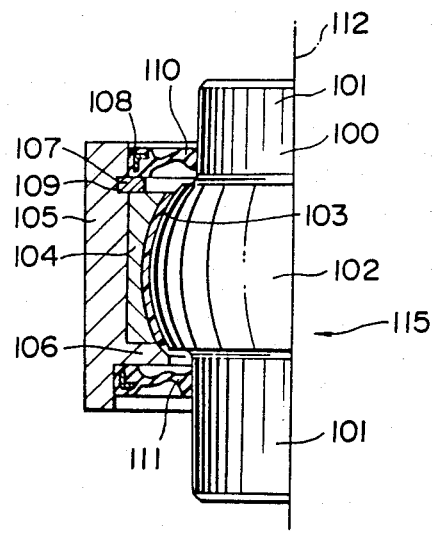
FIG. 10 a sectional view of a conventional pillow ball bush.

A pillow ball bush as a preferred embodiment of the joint of the present invention has been described. This pillow ball bush can be used, for example, as a suspension ball joint of a vehicle. More specifically, as shown in FIG. 7, the suspension ball joint constitutes a connection 84 between the chassis 83 of a vehicle and a lower arm 82 coupled to a king pin 81 of a steerable wheel of the vehicle. Either one of the shaft portions 7, 8 or the socket 1 of the joint is connected to the chassis 83 while the other is fixed to the lower arm 82.

Compared to a conventional pillow ball bush used for the same purpose and having boot portions fixed by caulking to the outer periphery of the socket, the pillow ball bush of the invention provides an advantage in that the assembly is facilitated and the boot portions are protected from damaging force due to, for example, collision with flying stones, by virtue of the fact that the boot portions are not exposed. It is to be understood also that, since the caulked portions of the plug having rather inferior corrosion resistance are placed in the space sealed by the boot portions, the corrosion of the joint is remarkably suppressed.

Figure 8:
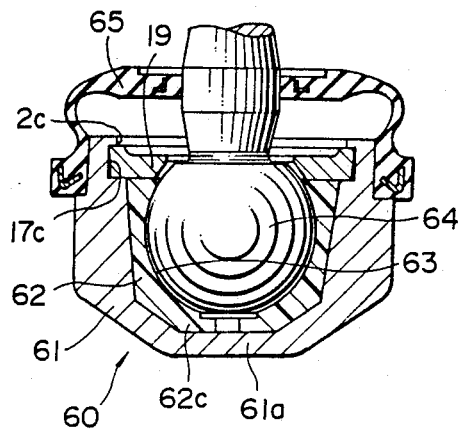
FIGS. 8 and 9 are sectional views of ball joints as different preferred embodiments of the joint in accordance with the present invention.

The joint of the invention can also be used as a ball joint, instead of being used as a pillow ball bush. Referring to FIG. 8, a ball joint 60 as an embodiment of the present invention has a plug 19 which is substantially the same as the plug 19 used in the embodiment shown in FIGS. 1 to 3. The plug 19 is fitted by caulking in a groove 17c formed in the inner peripheral surface of a socket 61 closed at its one end. The groove 17c is positioned adjacent to the open end of the bore in the socket 61. The ball joint shown in FIG. 8 also has a bearing assembly 62 of vertically split type composed of a pair of halves 62c. The bearing assembly 62 also is substantially closed at its one end, and has a recess 63 which slidably and rockably receives a ball 64. In this embodiment, a boot portion 65 is fitted on the outer peripheral surface of the socket 61 so as to cover the open and of the socket 61. This, however, is only illustrative and the arrangement may be such that the bore 2c in the socket is axially elongated so as to be able to receive the boot portion 65. In this embodiment, the flange portion of the socket 61 is constituted by the bottom wall 61a of the socket 61.

Figure 9:
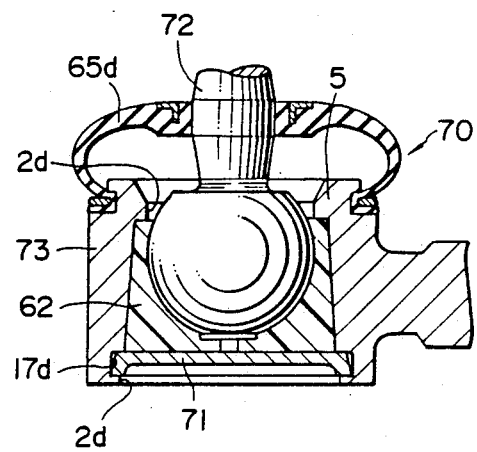

FIG. 9 shows another example of ball joint as an embodiment of the joint of the invention. The ball joint generally denoted by 70 has a disk-shaped plug 71 which is similar to the plug 19 of the ball joint shown in FIG. 8. In tis case, however, the plug 71 fits in a groove 17d formed in the wall surface of a bore 2d in a socket 73 at the opposite said of the ball to the shaft 72 of the joint 70. The baring assembly 62, which has a vertically split type construction also in this case, is substantially closed at its one end, and a boot portion 65d is secured to the outer periphery of the socket 73 so as to cover the opening of the socket 73. The arrangement may also be such that the bore 3d in the socket is axially elongated so as to be able to receive the boot portion 65d.

What is claimed is:

1. A joint comprising:
 a cylindrical socket which is opened at at least one end thereof and has an annular groove in an inner circumferential wall thereof at said one open end side;
 an inner joint portion having a ball-shaped portion and at least one shaft portion integral with said ball-shaped portion;
 a bearing portion fitted in said socket portion and having a recess which has a configuration complementary to an outer configuration of said inner joint portion, said recess rockably and slidably supports said ball portion of said inner joint portion, said bearing portion being supported at an end of said socket opposite to the open end of said socket by a flange portion which projects radially inward from the end of said socket opposite to said open end;
 a support member disposed in the annular groove so as to cooperate with said flange portion to support said bearing portion in the axial direction, said support member comprising a plug having a tabular portion which contacts end surfaces of said bearing portion at said open end and a cylindrical portion axially extending from an outer periphery of said tubular portion towards said one open end, said cylindrical portion having an upper expanded end, formed by caulking said cylindrical portion once said plug is disposed in said annular groove, that abuts a side wall of said annular groove so as to hold said plug in said annular groove and a lower end spaced from said side wall so as to allow the residue caulking material to accumulate; and a boot portion disposed between said shaft portion of said inner joint portion and said socket so as to prevent foreign matter from coming into a gap between the sliding contact surfaces of said bearing portion and said ball-shaped portion.

2. A joint according to claim 1, wherein said plug further comprises an annular member surrounding said shaft portion of said inner joint portion, said boot portion being disposed at the axially outer side of said plug.

3. A joint according to claim 2 wherein said boot portion is disposed between an inner peripheral surface of the wall of said socket defining said opening and an outer peripheral surface of said shaft portion of said inner joint portion.

4. A joint according claim 1 wherein said inner circumferential wall is conically shaped for receiving a similarly shaped bearing portion.

* * * * *